United States Patent
Jones et al.

(10) Patent No.: US 7,428,143 B1
(45) Date of Patent: Sep. 23, 2008

(54) TABLET COMPUTER PALETTE WITH EXTENDED BEZEL

(75) Inventors: Ronnie L. Jones, Austin, TX (US); David C. Collier, Austin, TX (US)

(73) Assignee: Motion Computing, Inc., Austin, TX (US)

(*) Notice: Subject to any disclaimer, the term of this patent is extended or adjusted under 35 U.S.C. 154(b) by 632 days.

(21) Appl. No.: 11/061,700

(22) Filed: Feb. 18, 2005

(51) Int. Cl.
*G06F 1/16* (2006.01)

(52) U.S. Cl. .................. 361/683; 224/929

(58) Field of Classification Search ......... 361/679–683; 312/223.1, 223.2; 224/217, 218, 221, 222, 224/929, 930
See application file for complete search history.

(56) References Cited

U.S. PATENT DOCUMENTS

| | | | |
|---|---|---|---|
| 5,100,098 A * | 3/1992 | Hawkins ............ 248/291.1 |
| 5,420,607 A * | 5/1995 | Miller et al. .......... 345/156 |
| 5,506,749 A * | 4/1996 | Matsuda ............... 361/683 |
| 5,657,459 A * | 8/1997 | Yanagisawa et al. ...... 361/681 |
| 5,737,183 A * | 4/1998 | Kobayashi et al. ....... 361/683 |
| 5,898,932 A * | 4/1999 | Zurlo et al. ............. 455/573 |
| 6,028,765 A | 2/2000 | Swindler et al. |
| 6,532,152 B1 | 3/2003 | White et al. |
| 6,556,228 B1 * | 4/2003 | Camis ................... 347/139 |
| 6,882,524 B2 * | 4/2005 | Ulla et al. ............... 361/680 |
| 6,937,464 B2 * | 8/2005 | Adams et al. ........... 361/681 |
| 6,967,836 B2 * | 11/2005 | Huang et al. ........... 361/687 |
| 7,236,356 B2 * | 6/2007 | Ulla et al. ............... 361/683 |
| 2002/0078291 A1 | 6/2002 | Sutton et al. |
| 2003/0213822 A1 | 11/2003 | Lautner |
| 2003/0231462 A1 | 12/2003 | Kwitek |
| 2006/0221565 A1 * | 10/2006 | Doherty et al. .......... 361/683 |

* cited by examiner

*Primary Examiner*—Jayprakash N Gandhi
*Assistant Examiner*—Anthony Q Edwards
(74) *Attorney, Agent, or Firm*—Kevin L. Daffer; Daffer McDaniel, LLP

(57) ABSTRACT

A palette for a pen tablet computer that facilitates secure gripping of the computer by the user and operation thereof. One edge of the palette includes a palm swell on one side, function buttons on the opposing side, and a thumb hole extending between the two sides. A support arm engagement region extends from the one edge diagonally to the opposite, parallel edge. In one form, the computer can be selectively attached and detached from the palette.

20 Claims, 2 Drawing Sheets

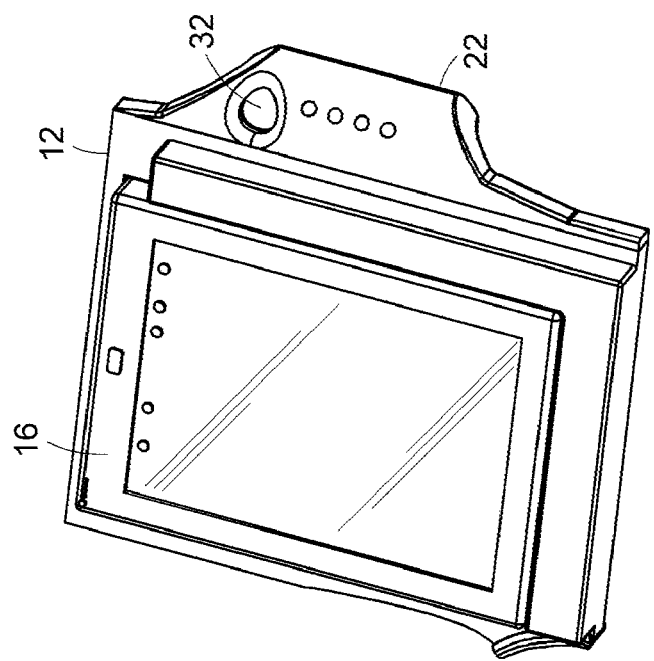
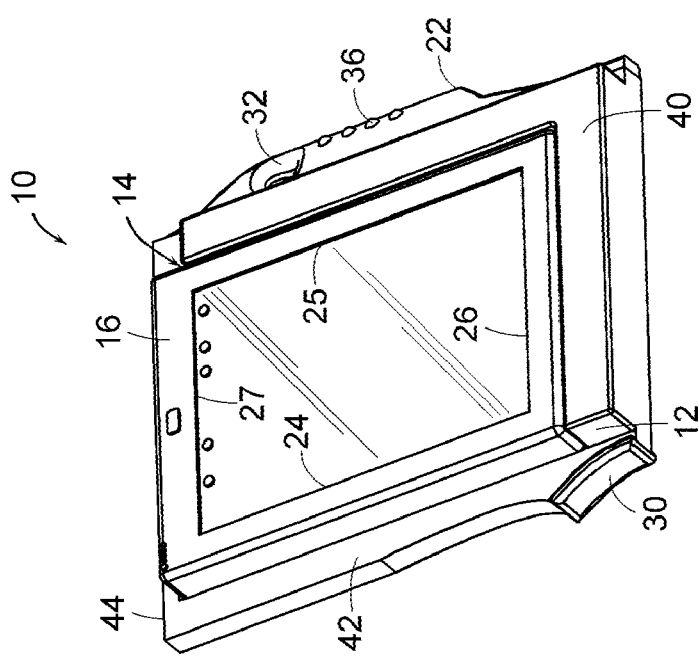

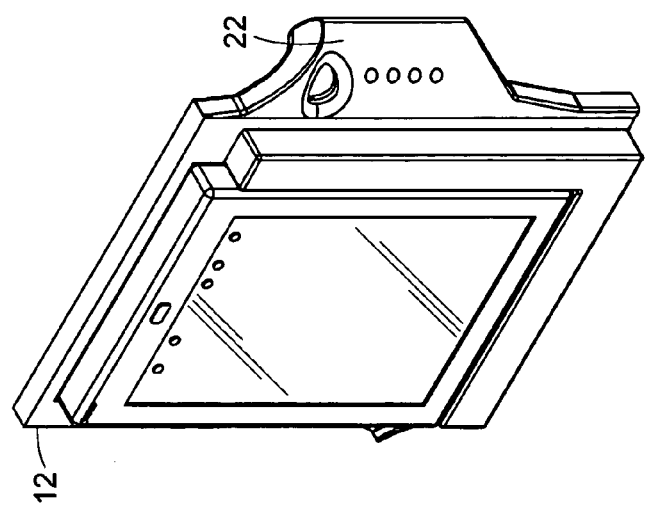
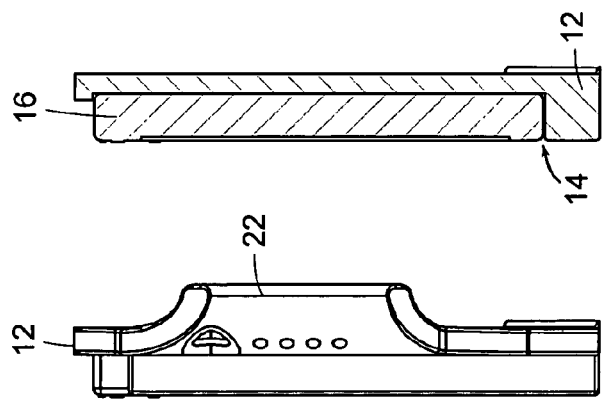
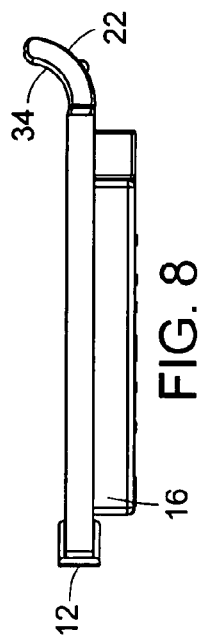
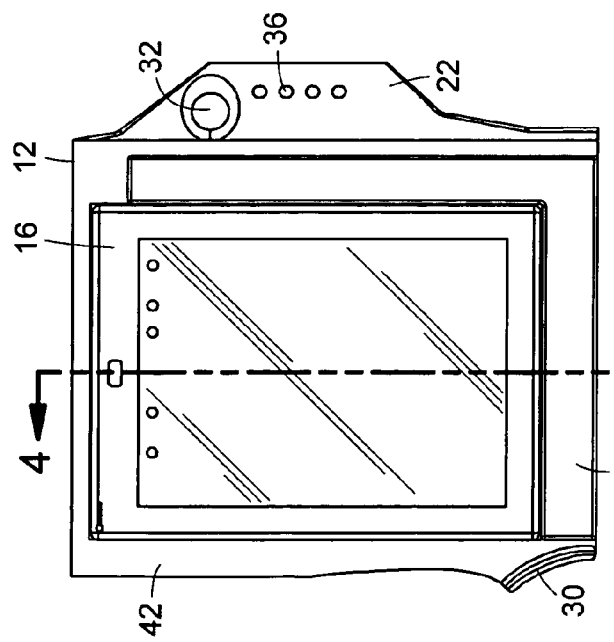
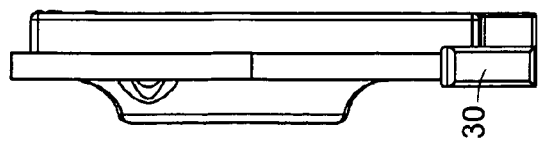

TABLET COMPUTER PALETTE WITH EXTENDED BEZEL

BACKGROUND OF THE INVENTION

1. Field of the Invention

The present invention generally relates to methods and systems for holding and operating a portable computing system. In particular, the present invention relates to a palette for a pen tablet computer which permits ease of use and retention of the computer during use.

2. Description of the Related Art

The following descriptions and examples are not admitted to be prior art by virtue of their inclusion within this section.

Portable computing systems are becoming increasingly popular, and many different types of portable computing systems are currently available such as pen tablet personal computers (pen tablet PCs), personal digital assistants (PDAs), and cellular telephones that have capabilities other than telephony. As used herein, a "pen tablet" computer is any computing device where the user uses a stylus or handheld pointer as an input device, including such handheld PDA's and the larger variety of arm held computing devices. Many types of handheld or portable systems are currently designed such that they can be used in multiple orientations, typically "landscape" or "portrait." For example, depending on the data being displayed on the system, a position of a screen and a display orientation of the portable system may be altered to accommodate the data. In other examples, the position of the screen and the display orientation of a pen tablet computer may be altered depending on the preference of a user, the task being performed by the user, or an application being used on the system.

The term "landscape orientation" generally refers to an orientation of a display screen in which the largest lateral dimension is in the substantially horizontal direction with respect to the user. In contrast, the term "portrait orientation" generally refers to an orientation of a display screen in which the largest lateral dimension is in the substantially vertical direction with respect to the user. The terms "horizontal" and "vertical" as used herein are intended to specify a direction with respect to a user and are not intended to convey any other geometrical direction.

Typically, pen tablet computers are grasped by the user with a support hand curled around an edge, which frees up the writing hand to operate the stylus. Such ergonomics have led to discomfort in holding, heat discomfort, poor writing angles, and dropped computers. To address these problems, various grips and other ergonomic improvements have been proposed. U.S. Pat. Application 2003/0213822 proposes a pistol grip on the bottom of the computer, while U.S. Pat. No. 6,028,765 proposes removable grips to provide a gripping function and some degree of shock protection. U.S. Pat. No. 6,532,152 suggests particular molded regions on the computer housing to enhance the gripping function, while U.S. Pat. Application 2003/0231462 proposes hand pads for wrist support. All patents cited herein are incorporated by reference to the maximum extent allowable by law.

While such portable computer housing improvements have addressed the problem of providing better gripping surfaces, they have largely failed to optimize a user's use and comfort while operating a pen tablet computer. Accordingly, it is desirable to develop a method and a system for grasping a pen tablet computer which minimizes the chance to drop the computer, minimizes user discomfort, and optimizes the user's operation thereof while keeping the configuration of the system relatively simple and inexpensive.

SUMMARY OF THE INVENTION

The problems outlined above are addressed by the pen tablet palette and method of use of the present invention. In a broad aspect, the palette housing includes a support arm engagement region adapted such that the user's support forearm extends diagonally underneath the housing. A hand engagement region is configured opposite the support arm engagement region and includes both a thumb indentation and a finger area. In preferred form, the engagement region includes a palm swell and a plurality of function keys in the finger area. Preferably, the housing additionally includes a bezel extension approximately level with the writing surface of the pen tablet computer to actively support the user's writing hand.

BRIEF DESCRIPTION OF THE DRAWINGS

Further advantages of the present invention may become apparent to those skilled in the art with the benefit of the following detailed description of the preferred embodiments and upon reference to the accompanying drawings in which:

FIG. 1 is a perspective view illustrating one embodiment of a pen tablet computer in accordance with the present invention depicting the display surface;

FIG. 2 is a perspective view similar to FIG. 1, but depicts a different view;

FIG. 3 is a plan view similar to FIG. 1;

FIG. 4 is a cross sectional view of the pen tablet computer of FIG. 3;

FIG. 5 is a side view of the computer of FIG. 3 illustrating in more detail the bezel extension, palm swell, and function buttons of a pen tablet computer in accordance with the present invention;

FIGS. 6-8 are respective side views of the pen tablet computer of FIG. 3; and

FIG. 9 is a perspective view similar to FIG. 2, but of a different orientation.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning to the drawings, FIG. 1 illustrates a computing system 10 in accordance with a preferred embodiment. The computing system 10 includes a palette 12 having a slot 14 adapted to receive a pen tablet computer 16 therein. Preferably, pen tablet computer 16 snaps into slot 14, but other types of latching mechanisms are acceptable. Pen tablet computer 16 is illustrated in a portrait orientation, but the orientation can be modified to the user's specifications.

As perhaps best illustrated in FIGS. 1 and 3, the computing system 10 includes a support arm engagement region on the under side of pen tablet computer 16 extending from a region on the user's forearm, near the user's elbow to a hand engagement region 22. To gain some perspective of the orientation and configuration of the palette 12, the sides of pen tablet computer 16 have been numbered in FIG. 1 as parallel longsides 24, 25 and parallel short-sides 26, 27. As can be seen, a padded rounded elbow/arm pad 30 is molded into palette 12 in the vicinity of the intersection of sides 24 and 26. On the other hand, hand engagement region 22 is in the vicinity of the midpoint of side 25. This allows the support arm of the user to extend diagonally across the underside of pen tablet computer 16 (see FIG. 2). In more detail, hand engagement region 22 includes a thumb indentation 32 which permits the thumb of the user's support arm to extend from the underside up through palette 12.

As perhaps best illustrates in FIGS. 1 and 8, the underside of palette 12 in hand engagement region 22 includes a palm swell 34 for receiving the palm of the support arm of the user. With the palm engaged in palm swell 34, the fingers of the user's support arm extend around the edge of palette 12 (as illustrated in FIG. 8) to the topside of hand engagement region 22. In a preferred form, a number of function buttons 36 are disposed for operation by the user's support hand.

The bezel extension 40 extends on the topside of palette 12 in the vicinity of sides 25, 26. As perhaps best illustrated in FIG. 1, bezel extension 40 in the region of the intersection of sides 25, 26 is configured to be approximately level or flush with the writing surface of pen tablet computer 16, so that the user's writing hand may comfortably rest on bezel extension 40.

Palette 12 includes in the vicinity of side 24 an accessory area 42 which is available for typical portable computing accessories, such as additional batteries, plug-ins, PCMCIA port, GPS port, solar panel, etc. Additionally, a wireless antenna 44 can be incorporated into palette 12. It will be appreciated that accessory area 42 or antenna 44 could be repositioned for design convenience at other locations in palette 12.

Many other alternative embodiments may be adapted to the embodiments of FIGS. 1-9, as one skilled in the art will appreciate. For example, instead of making palette 12 and pen tablet computer 16 separate with a slot 14 for receiving pen tablet computer 16, the housing of pen tablet computer 16 could be modified to include the features of palette 12 so that an integral computing system 10 is the result. As another example, thumb indentation 32 is illustrated as a hole extending through palette 12, but other configurations such as curvilinear indentation into the edge of palette 12 might be equally acceptable. The dimensions of bezel extension 40 (and other features such as armrest 30) might be varied to suit the user preference or particular application. It is intended that the following claims be interpreted to embrace all such modifications and changes and, accordingly, the drawings and the specification are to be regarded in an illustrative rather than a restrictive sense.

What is claimed:

1. A pen tablet computer configured for reception on the support arm of a user, comprising:
    a rectangular writing area having substantially parallel first and second sides A adjoined by substantially parallel first and second sides B;
    a housing coupled to said writing area having:
        a support arm engagement region adapted to rest on a user's support forearm with the intersection of first side A and first side B juxtaposed towards the user's support arm elbow;
        a hand engagement region adapted for receiving the hand of a user's support arm, wherein the hand engagement region is proximate to said second side A and closer to the intersection of second side A and second side B than to the intersection of second side A and first side B, and wherein the hand engagement region comprises:
            an indentation configured for receiving the thumbs;
            a finger area proximate to the indentation on one side of the hand engagement region, wherein the finger area includes one or more function buttons; and
            a palm receiving swell on the opposing side of the hand engagement region.

2. The pen tablet computer of claim 1, wherein said finger area includes a plurality of function buttons.

3. The pen tablet computer of claim 1, said housing further including an accessory region having a battery port.

4. The pen tablet computer of claim 1, said housing further including a wireless antenna.

5. The pen tablet computer of claim 1, wherein said hand engagement region has a bezel extension adjacent a portion of first side B of the writing area.

6. The pen tablet computer of claim 1, wherein said support arm engagement region includes a concave armrest in the vicinity of the intersection of first side A and first side B.

7. A method of using a rectangular shaped pen tablet computer, comprising:
    configuring an arm engagement region proximate one corner of the pen tablet computer;
    configuring a hand engagement region diagonally opposed from said arm engagement region, and having a thumb indentation and a finger area, said thumb indentation comprising a rounded tunnel extending from one side of the tablet to the opposed side and adapted for receiving the thumb of the user;
    grasping the pen tablet computer with the arm engagement region overlaid a user's support arm near the elbow, and the hand engagement region overlaid the palm of the user's support hand with the thumb engaging the thumb indentation, and the fingers engaging the finger area;
    configuring a bezel extension to the pen tablet computer between the arm and hand engagement regions; and
    supporting a portion of the user's writing hand on said bezel extension.

8. The method of claim 7, said finger area including a plurality of function buttons, and including the step of periodically operating one or more of the function buttons.

9. The method of claim 7, said grasping step including positioning the rectangular tablet with a corner region abutting the user's elbow region.

10. A palette for a pen tablet computer, comprising:
    a rectangular slot for receiving a rectangular shaped pen tablet computer;
    a bezel extension adjoining one side of the slot and comprising a writing hand rest region approximately flush with the pen tablet computer when received in said slot;
    a support arm engagement region on one side of said bezel extension; and
    a support hand engagement region on the other side of said bezel extension, including:
        a thumb indentation and a finger area adapted for receiving the respective thumb and fingers of a user's support hand.

11. The palette of claim 10, wherein the finger area includes a plurality of function buttons.

12. The palette of claim 10, including an accessory region of the palette spaced from said hand engagement region for coupling accessories thereto.

13. The palette of claim 12, wherein said accessory region includes a battery plug-in port.

14. The palette of claim 12, wherein said accessory region includes a GPS plug-in port.

15. The palette of claim 12, wherein said accessory region includes a PCMCIA port.

16. The palette of claim 10, wherein the support hand engagement region includes a palm swell on the side opposite said finger area.

17. The palette of claim 10, wherein said thumb indentation comprises a thumbhole extending from one side of the palette to the other side.

18. A pen tablet computer configured for reception on the support arm of a user, comprising:

a rectangular writing area;

a housing coupled to said rectangular writing area, including:

a support arm engagement region adapted such that the user's support forearm extends diagonally underneath the housing;

a support hand engagement region configured opposite the support arm engagement region, including a thumb hole and a finger area adapted for receiving the respective thumb and fingers of a user's support hand; and a bezel extension proximate to the support hand engagement region, including a writing hand rest region approximately flush with the writing area.

19. The pen tablet computer of claim 18, wherein said housing is integrated with said rectangular writing area.

20. The pen tablet computer of claim 18, wherein said housing is removably attached to said rectangular writing area.

* * * * *